United States Patent
Kagata et al.

(10) Patent No.: US 11,945,248 B2
(45) Date of Patent: Apr. 2, 2024

(54) RECORDING METHOD

(71) Applicant: Seiko Epson Corporation, Tokyo (JP)

(72) Inventors: Takayoshi Kagata, Shiojiri (JP); Katsuko Aoki, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 205 days.

(21) Appl. No.: 17/510,471

(22) Filed: Oct. 26, 2021

(65) Prior Publication Data

US 2022/0126618 A1 Apr. 28, 2022

(30) Foreign Application Priority Data

Oct. 27, 2020 (JP) ................................ 2020-179516

(51) Int. Cl.
| | | |
|---|---|---|
| *B41M 5/025* | (2006.01) | |
| *B41M 5/035* | (2006.01) | |
| *B41M 5/44* | (2006.01) | |
| *C09D 11/54* | (2014.01) | |
| *D06P 5/00* | (2006.01) | |
| *D06P 5/28* | (2006.01) | |

(52) U.S. Cl.
CPC .......... *B41M 5/0256* (2013.01); *B41M 5/035* (2013.01); *B41M 5/0356* (2013.01); *B41M 5/44* (2013.01); *C09D 11/54* (2013.01); *B41M 2205/10* (2013.01); *B41M 2205/38* (2013.01); *D06P 5/002* (2013.01); *D06P 5/004* (2013.01)

(58) Field of Classification Search
CPC .. B41M 5/0256; B41M 5/035; B41M 5/0356; B41M 5/44; B41M 2205/10; B41M 2205/38; C09D 11/54; D06P 5/002; D06P 5/004

See application file for complete search history.

(56) References Cited

U.S. PATENT DOCUMENTS

| | | | |
|---|---|---|---|
| 2004/0157735 A1* | 8/2004 | Hare | ...................... B41M 5/035 503/201 |
| 2009/0104383 A1 | 4/2009 | Terao et al. | |
| 2011/0169901 A1* | 7/2011 | Pinto | ..................... D06P 1/5235 347/101 |
| 2018/0093525 A1* | 4/2018 | Cobb, III | ............. B41M 5/0356 |

FOREIGN PATENT DOCUMENTS

| | | | |
|---|---|---|---|
| JP | 2018002757 A | * | 1/2018 |
| WO | 2007-111302 A1 | | 10/2007 |

* cited by examiner

*Primary Examiner* — Gerard Higgins

(74) *Attorney, Agent, or Firm* — Harness, Dickey & Pierce, P.L.C.

(57) ABSTRACT

A recording method includes a colored ink adhering step of adhering a colored ink composition to an intermediate transfer medium by an ink jet method to form a recording region A, a clear ink adhering step of adhering a clear ink composition to at least a portion of a recording medium to form a region B, and a transfer step of transferring an image formed in the recording region A to the region B of the recording medium by heating in a state where the recording region A of the intermediate transfer medium faces the region B of the recording medium. The colored ink composition contains a sublimation dye, a water-soluble organic solvent, and water, and the intermediate transfer medium has a peeling layer containing a resin having a glass transition point of 100° C. or more and 200° C. or less.

11 Claims, No Drawings

RECORDING METHOD

The present application is based on, and claims priority from JP Application Serial Number 2020-179516, filed Oct. 27, 2020, the disclosure of which is hereby incorporated by reference herein in its entirety.

BACKGROUND

1. Technical Field

The present disclosure relates to a recording method.

2. Related Art

A sublimation transfer method includes transferring a sublimation dye, adhered to an intermediate recording body, to a fabric such as polyester or the like by, for example, an ink jet method. In recent years, various products have been simply produced by recording on fabrics using the sublimation transfer method, and the sublimation transfer method has been desired to be applied to fabrics other than polyester.

However, a usual sublimation transfer method has a problem of difficulty in forming high-quality images on fabrics other than polyester. Thus, a method using transfer paper having a release agent layer is known. For example, WO2007/111302 discloses a dry transfer textile printing method using transfer paper, which has a release agent layer and an ink receiving layer, and including transferring and fixing a water-soluble dye ink to a fabric by pressurized heating treatment of the transfer paper, to which an ink composition has been adhered, for the fabric.

However, it was found that the method described in WO20 07/111302 has a problem that transfer does not satisfactorily proceed in a low-duty portion.

SUMMARY

According to an aspect of the present disclosure, a recording method includes a colored ink adhering step of adhering a colored ink composition to an intermediate transfer medium by an ink jet method to form a recording region A, a clear ink adhering step of adhering a clear ink composition to at least a portion of a recording medium to form a region B, and a transfer step of transferring an image formed in the recording region A to the region B of the recording medium by heating in a state where the recording region A of the intermediate transfer medium faces the region B of the recording medium. The colored ink composition contains a sublimation dye, a water-soluble organic solvent, and water, and the intermediate transfer medium has a peeling layer containing a resin having a glass transition point of 100° C. or more and 200° C. or less.

DESCRIPTION OF EXEMPLARY EMBODIMENTS

An embodiment of the present disclosure (referred to as a "present embodiment" hereinafter) is described in detail below, but the present disclosure is not limited to this, and various modifications can be made within a range not deviating from the gist of the present disclosure.

1. Recording Method

A recording method according to a present embodiment includes a colored ink adhering step of adhering a colored ink composition to an intermediate transfer medium by an ink jet method to form a recording region A, a clear ink adhering step of adhering a clear ink composition to at least a portion of a recording medium to form a region B, and a transfer step of transferring an image formed in the recording region A to the region B of the recording medium by heating in a state where the recording region A of the intermediate transfer medium faces the region B of the recording medium. The colored ink composition contains a sublimation dye, a water-soluble organic solvent, and water, and the intermediate transfer medium has a peeling layer containing a resin having a glass transition point of 100° C. or more and 200° C. or less.

As described above, a known example of a usual sublimation transfer method is a method including transferring a portion of a layer of an intermediate transfer medium to a recording medium. However, it was found that depending on the ejection amount of the colored ink composition adhered to the intermediate transfer medium, adhesive force to the recording medium is not satisfactorily exhibited, thereby causing a problem that transfer partially does not proceed and consequently color development in a low-duty portion deteriorates.

On the other hand, in the present embodiment using the clear ink composition, the amount of the colored ink composition ejected to a low-duty portion is compensated by adhering the clear ink composition to at least a portion of the recording medium, and thus good transfer can be performed over the whole of the recording region, thereby improving color development in the low-duty portion. Each of the steps is described in detail below.

1. 1. Colored Ink Adhering Step

The colored ink adhering step is a step of adhering the colored ink composition to the intermediate transfer medium by an ink jet method to form the recording region A. In an ink jet system, an ink composition can be ejected by using a known ink jet recording apparatus. An ejection method is not particularly limited, but for example, a piezo system, a system of ejecting an ink using bubbles generated by heating the ink, or the like can be used.

In the colored ink adhering step, the colored ink composition is preferably adhered to the peeling layer of the intermediate transfer medium, forming the recording region A on the peeling layer.

1. 1. 1. Colored Ink Composition

The colored ink composition contains the sublimation dye, the water-soluble organic solvent, and water, and if required, may further contain a surfactant, a dispersant, etc.

1. 1. 1. 1. Sublimation Dye

In the present embodiment, the "sublimation dye" represents a dye having the property of being sublimated by heating. Examples of the sublimation dye include, but are not particularly limited to, C. I. Disperse Yellow 3, 7, 8, 23, 39, 51, 54, 60, 71, and 86; C. I. Disperse Orange 1, 1:1, 5, 20, 25:1, 33, 56, and 76; C. I. Disperse Brown 2; C. I. Disperse Red 11, 50, 53, 55, 55:1, 59, 60, 65, 70, 75, 93, 146, 158, 190, 190:1, 207, 239, and 240; C. I. Disperse Violet 8, 17, 23, 27, 28, 29, 36, and 57; C. I. Disperse Blue 14, 19, 26, 26:1, 35, 55, 56, 58, 64, 64:1, 72, 72:1, 81, 81:1, 91, 95, 108, 131, 141, 145, and 359, and the like.

1. 1. 1. 2. Water-Soluble Organic Solvent

Examples of the water-soluble organic solvent include, but are not particularly limited to, glycerin; glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, and the like; glycol monoethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, and the like; nitrogen-containing solvents such as 2-pyrrolidone, N-methyl-2-pyrrolidone, N-ethyl-2-pyrrolidone, and the like; and alcohols such as methanol, ethanol, n-propyl alcohol, iso-propyl alcohol, n-butanol, 2-butanol, tert-butanol, iso-butanol, n-pentanol, 2-pentanol, 3-pentanol, tert-pentanol, and the like. The water-soluble organic solvents may be used alone or in combination of two or more.

Among these, glycerin, glycols, glycol monoethers, and nitrogen-containing solvents are preferred, glycerin, glycols, and glycol monoethers are more preferred, and glycerin, propylene glycol and triethylene glycol monomethyl ether are still more preferred. The use of such a water-soluble organic solvent tends to more improve color development in a low-duty portion.

The content of the water-soluble organic solvent relative to the total amount of the colored ink composition is preferably 7.5% to 35% by mass, more preferably 10% to 30% by mass, and still more preferably 15% to 25% by mass. When the content of the water-soluble organic solvent is within the range described above, there is a tendency to more improve wettability to the intermediate transfer medium, to more improve color development in a low-duty portion, and to more improve ejection stability.

1. 1. 1. 3. Water

The content of water relative to the total amount of the colored ink composition is preferably 60% to 90% by mass, more preferably 65% to 85% by mass, and still more preferably 70% to 80% by mass.

1. 1. 1. 4. Surfactant

Examples of the surfactant include, but are not particularly limited to, an acetylene glycol-based surfactant, a fluorine-based surfactant, and a silicone-based surfactant. The surfactants may be used alone or in combination of two or more.

The acetylene glycol-based surfactant is not particularly limited, but is, for example, preferably one or more selected from 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol.

Examples of the fluorine-based surfactant include, but are not particularly limited to, perfluoroalkylsulfonate salts, perfluoroalkylcarboxylate salts, perfluoroalkylphosphate esters, perfluoroalkylethylene oxide adducts, perfluoroalkylbetaine, and perfluoroalkylamine oxide compounds.

Examples of the silicone-based surfactant include a polysiloxane-based compound, polyether-modified organosiloxane, and the like.

Among these, the silicone-based surfactant is preferred. The use of such a surfactant tends to more improve wettability to the intermediate transfer medium and to more improve the color development and ejection stability in a low-duty portion.

The content of the surfactant relative to the total amount of the colored ink composition is preferably 0.1% to 2.0% by mass, more preferably 0.2% to 1.5% by mass, and still more preferably 0.3% to 1.0% by mass. When the content of the surfactant is within the range described above, there is a tendency to more improve wettability to the intermediate transfer medium and to more improve the color development and ejection stability in a low-duty portion.

1. 1. 1. 5. Dispersant

The colored ink composition may contain a dispersant. When the dispersant is contained, there is a tendency to more improve the dispersion stability of the sublimation dye and tends to more improve storage stability, ejection stability, etc. Examples of the dispersant include, but are not particularly limited to, an anionic dispersant, a nonionic dispersant, and a polymeric dispersant. The dispersants may be used alone or in combination of two or more.

Examples of the anionic dispersant include, but are not particularly limited to, an aromatic sulfonic acid-formalin condensate, a β-naphthalenesulfonic acid-formalin condensate, an alkylnaphthalenesulfonic acid-formalin condensate, and a creosote oil sulfonic acid-formalin condensate.

Examples of an aromatic sulfonic acid include, but are not particularly limited to, alkylnaphthalene sulfonic acid such as creosote oil sulfonic acid, cresol sulfonic acid, phenol sulfonic acid, β-naphthol sulfonic acid, methylnaphthalene sulfonic acid, butylnaphthalene sulfonic acid, and the like; a mixture of β-naphthalene sulfonic acid and β-naphthol sulfonic acid; a mixture of cresol sulfonic acid and 2-naphthol-6-sulfonic acid; lignin sulfonic acid; and the like.

Examples of the nonionic dispersant include, but are not particularly limited to, a phytosterol ethylene oxide adduct, a cholestanol ethylene oxide adduct, and the like.

Examples of the polymeric dispersant include, but are not particularly limited to, polyacrylic acid partial alkyl esters, polyalkylene polyamine, polyacrylate salts, styrene-acrylic acid copolymer, vinylnaphthalene-maleic acid copolymer, and the like.

The content of the dispersant relative to the total amount of the sublimation dye is preferably 1% to 200% by mass and more preferably 50% to 150% by mass. When the content of the dispersant is within the range described above, there is a tendency to more improve the dispersion stability of the sublimation dye and to more improve storage stability, ejection stability, etc.

1. 1. 1. 6. Other Additives

If required, the colored ink composition may contain an anti-mold agent, an antiseptic agent, an antioxidant, an ultraviolet absorber, a chelating agent, an oxygen absorber, a pH adjuster (for example, triethanolamine, adipic acid, or potassium hydroxide), or a solubilizer, and other various additives which can be used in usual inks.

1. 1. 1. 7. Surface Tension

The surface tension $S_1$ at 25° C. of the colored ink composition is preferably 20 to 30 mN/m, more preferably 21 to 27 mN/m, and still more preferably 22 to 25 mN/m. When the surface tension $S_1$ of the colored ink composition is within the range described above, there is a tendency to more improve wettability to the intermediate transfer medium and to more improve the color development and ejection stability in a low-duty portion.

The surface tension in the present embodiment can be measured by at a liquid temperature of 25° C. by a Wilhelmy method using a surface tensiometer (surface tensiometer, CBVP-Z manufactured by Kyowa Interface Science Co., Ltd.).

1. 1. 2. Intermediate Transfer Medium

The intermediate transfer medium used in the present embodiment has the peeling layer containing a resin having a glass transition point of 100° C. or more and 200° C. or less. By using the intermediate transfer medium, the peeling layer can be separated from the intermediate transfer medium and then transferred to a recording medium in a transfer step described later. This can produce the recording medium on which the peeling layer has been adhered.

The intermediate transfer medium has the peeling layer formed on a substrate, and the peeling layer is configured to have peelability that the peeling layer is separated from the substrate by heating so as to be adhered to the recording medium by heating in the state of facing the recording medium. From this viewpoint, the glass transition point of the resin contained in the peeling layer is preferably 100° C. or more and 200° C. or less. This enables to separate the peeling layer from the intermediate transfer medium and adhere to the recording medium by heating in the transfer step.

In the present embodiment, if required, the intermediate transfer medium may have another layer other than the peeling layer. The other layer is, for example, an ink receiving layer formed on the surface of the peeling layer on the side opposite to the substrate side. For example, in the present embodiment, the colored ink composition may be adhered to the ink receiving layer in the colored ink adhering step, and the peeling layer may be separated from the intermediate transfer medium in the transfer step so that the peeling layer and the ink receiving layer are adhered to the recording medium. In this case, the two layers, the ink receiving layer and the peeling layer, are transferred to the recording medium so that the ink receiving layer is adhered to the recording medium. Also, in this case, the colored ink composition adhered to the ink receiving layer may be sublimated and diffused to the peeling layer from the ink receiving layer by heating in parallel with the transfer in the transfer step.

Also, the peeling layer is preferably a transparent layer, and the ink receiving layer is preferably an opaque layer, particularly, a white layer. Thus, when the colored ink composition adhered to the ink receiving layer is sublimated and diffused from the ink receiving layer to the peeling layer by heating in the transfer step, the white ink receiving layer serves as a layer which conceals the color of the recording medium, and an image with good color development can be formed due to diffusion of the sublimation dye to the peeling layer formed on the ink receiving layer regardless of the color of the recording medium.

The resin contained in the peeling layer is not particularly limited, but is, for example, one or more selected from the group consisting of polyester, polystyrene, polyacryl, polystyrene-acrylic resin, poly(ethylene-vinyl acetate), and a polymer based on diallyl methyl ammonium chloride. When such a resin is contained, there is a tendency to more improve peelability, to more improve the color development in a low-duty portion, and to more suppress blurring.

Examples of the intermediate transfer medium include, but are not particularly limited to, Subli-Light (No-cut), Subli-Flex (No-cut), and the like manufactured by Forever Inc.

1. 2. Clear Ink Adhering Step

The clear ink adhering step is a step of adhering the clear ink composition to at least a portion of the recording medium to form a region B. The method for adhering the clear ink composition is not limited to the ink jet method, and roller coating, spray coating, or the like may be used.

Among these, the ink jet method is preferred in view of the fact that the adhesion position and adhesion amount of the clear ink composition can be highly precisely controlled. The use of this method enables to adjust the position and amount of the clear ink composition adhered to the recording medium, and thus enables to produce a recorded matter having high color development and little blurring by the transfer step described later. Specifically, the use of the ink jet method can more enhance color development by adhering a relatively large amount of the clear ink composition to a portion of the region B corresponding to a portion of the recording region A with a small amount of the colored ink composition adhered thereto, and when the ink compositions are excessively adhered, the use can suppress the occurrence of blurring by adhering a relatively small amount of the clear ink composition to a portion of the region B corresponding to a portion of the recording region A with a large amount of the colored ink composition adhered thereto.

More specifically, when the recording region A formed in the colored ink adhering step has a recording region A1 where the amount of the colored ink composition adhered thereto is less than 2.0 mg/inch$^2$, in the clear ink adhering step, the clear ink composition is preferably adhered to a region B1, which faces the recording region A1, in the region B. While when the recording region A has a recording region A2 where the amount of the colored ink composition adhered thereto is 2.0 mg/inch$^2$ or more, in the clear in adhering step, the clear ink composition is preferably adhered to a region B2, which faces the recording region A2, in the region B. This enables the clear ink composition to be adhered according to the amount of the colored ink composition adhered to the recording region A. Thus, color development can be more improved over the whole of the recording region A, and blurring can be suppressed.

1. 2. 1. Clear Ink Composition

In the present embodiment, the "clear ink" is not an ink used for coloring, but an ink used for another purpose. In the present embodiment, when the clear ink composition is adhered to the recording medium, the amount of liquid in an overlap region between the recording region A and the region B can be controlled to a predetermined amount or more in the transfer step described later. This tends to more improve the color development in a low-duty portion. The clear ink does not include simple water.

Examples of the components contained in the clear ink composition include the same examples as described above for the components, excluding the sublimation dye, of the colored ink composition. The clear ink composition contains a water-soluble organic solvent and water, and if required, may further contain a surfactant etc. The components contained in the clear ink composition may be the same as or different from those contained in the colored ink composition.

1. 2. 1. 1. Water-Soluble Organic Solvent

The water-soluble organic solvent is preferably glycerin, glycols, glycol monoethers, or nitrogen-containing solvent, more preferably glycerin, glycols, or glycol monoethers, and still more preferably glycerin, propylene glycol, triethylene glycol, or triethylene glycol monomethyl ether. The use of such a water-soluble organic solvent tends to more improve color development in a low-duty portion.

The content of the water-soluble organic solvent relative to the total amount of the clear ink composition is preferably 7.5% to 35% by mass, more preferably 10% to 30% by mass, and still more preferably 15% to 25% by mass. When the content of the water-soluble organic solvent is within the range described above, wettability to the intermediate transfer medium is improved, and the use of such a water-soluble organic solvent tends to more improve color development in a low-duty portion.

The colored ink composition and the clear ink composition preferably contain the same one or more water-soluble organic solvents and more preferably contain the same two or more water-soluble organic solvents. This allows sublimation/diffusion and transfer of the peeling layer to more preferably proceed in the transfer step described later, and tends to more improve color development of the resultant recorded matter and more suppress blurring.

1. 2. 1. 2. Water

The content of water relative to the total amount of the clear ink composition is preferably 70% to 99.5% by mass, more preferably 70% to 95% by mass, and still more preferably 75% to 90% by mass.

1. 2. 1. 3. Surfactant

The surfactant is preferably an acetylene glycol-based surfactant or a silicone-based surfactant, and more preferably a silicone-based surfactant. The colored ink composition and the clear ink composition preferably contain the same one or more surfactants. This allows sublimation/diffusion and transfer of the peeling layer to more preferably proceed in the transfer step described later, and tends to more improve color development of the resultant recorded matter and more suppress blurring.

The content of the surfactant relative to the total amount of the clear ink composition is preferably 0.1% to 2.0% by mass, more preferably 0.2% to 1.5% by mass, and still more preferably 0.3% to 1.0% by mass. When the content of the surfactant is within the range described above, there is a tendency to more improve color development in a low-duty portion.

1. 2. 1. 4. Surface Tension

The surface tension $S_2$ at 25° C. of the clear ink composition is preferably 20 to 40 mN/m, more preferably 21 to 32 mN/m, and still more preferably 22 to 28 mN/m. When the surface tension $S_2$ of the clear ink composition is within the range described above, there is a tendency to more improve ejection stability, to more improve wettability of the clear ink composition to the recording medium. and to more improve the color development in a low-duty portion.

Also, the absolute value of difference between the surface tension $S_1$ of the colored ink composition and the surface tension $S_2$ of the clear ink composition is preferably within 5.0, more preferably within 4.0, and still more preferably within 3.0. When a difference between the surface tension $S_1$ and the surface tension $S_2$ is within the range described above, sublimation/diffusion and transfer of the peeling layer to more preferably proceed in the transfer step described later, thereby causing a tendency to more improve color development of the resultant recorded matter and more suppress blurring. When a plurality of ink compositions are used as the colored ink composition, a difference in surface tension between each of the colored ink compositions and the clear ink composition is preferably within the range described above.

1. 2. 2. Recording Medium

Examples of the recording medium include, but are not particularly limited to, a fabric (a hydrophobic fiber fabric or the like), a resin (plastic) film, paper, wood, leather, glass, a metal, porcelain, and the like. The recording medium may have a three-dimensional shape such as a sheet shape, a spherical shape, a rectangular parallelopiped shape, or the like.

When the recording medium is a fabric, examples of the fibers constituting the fabric include, but are not particularly limited to, polyester fibers, nylon fibers, triacetate fibers, diacetate fibers, polyamide fibers, synthetic fibers or semi-synthetic fibers using two or more types of these fibers, natural fibers such as silk, cotton, wool, nylon, polyester, rayon, and the like, regenerated fibers such as rayon and the like. Also, a blend of two or more types of these fibers may be used.

Among these, a fabric containing cotton is preferred. Such a recording medium is frequently used as a fabric product, but a high-quality recorded matter is difficult to obtain by a usual sublimation transfer method, and the present disclosure is particularly useful.

When the recording medium is a resin (plastic) film, usable examples of the resin (plastic) film include, but are not particularly limited to, a polyester film, a polyurethane film, a polycarbonate film, a polyphenylene sulfide film, a polyimide film, a polyamide-imide film, and the like. The resin (plastic) film may be a laminate of a plurality of laminated layers or may be configured by a gradient material having a gradiently changing composition.

1. 3. Transfer Step]

The transfer step is a step of transferring an image formed in the recording region A to the region B of the recording medium by heating in a state where the recording region A of the intermediate transfer medium faces the region B of the recording medium. In this case, the transfer of the image includes transferring the image formed in the recording region A, together with the peeling layer of the intermediate transfer medium, to the recording medium.

The heating temperature in the transfer step is preferably 160° C. to 220° C., more preferably 160° C. to 190° C., and still more preferably 170° C. to 190° C. The heating temperature within the range described above tends to make it easy to peel and transfer the peeling layer from the intermediate transfer medium to the recording medium, and tends to more improve color development of the resultant recorded matter and more suppress blurring.

The heating time in the transfer step is preferably 15 to 90 seconds, more preferably 20 to 60 seconds, and still more preferably 20 to 30 seconds. The heating time within the range described above tends to make it easy to peel and transfer the peeling layer from the intermediate transfer medium to the recording medium and to more improve color development of the resultant recorded matter and more suppress blurring.

In the transfer step, heating is preferably performed in a state where the recording region A of the intermediate transfer medium and the region B of the recording medium are adhered to each other, and is more preferably performed in a pressurized state. The pressure in the transfer step is preferably 1.5 to 6 bar and more preferably 2 to 3 bar. The pressure within the range described above tends to make it easy to peel and transfer the peeling layer from the intermediate transfer medium to the recording medium, and to more improve color development of the resultant recorded matter and more suppress blurring.

The transfer step is preferably performed in a state where the amount of the clear ink composition adhered to the region B is a predetermined value or more. In this case, the amount of the clear ink composition adhered is preferably 1.0 mg/inch$^2$ or more, more preferably 3.0 to 25 mg/inch$^2$, and still more preferably 5.0 to 20 mg/inch$^2$. The clear ink composition adhered is evaporated with time, but when the amount of the clear ink composition adhered is within the range described above, there is a tendency to make it easy to separate and transfer the peeling layer from the intermediate transfer medium to the recording medium, and to more improve color development of the resultant recorded matter. Also, when the amount of the clear ink composition adhered is 25 mg/inch$^2$ or less, blurring tends to be more suppressed.

In the transfer step, the total amount of the colored ink composition and the clear ink composition adhered to the recording region A and the region B, respectively, is preferably 3.0 to 32 mg/inch$^2$, more preferably 4.0 to 25 mg/inch$^2$, and still more preferably 5.0 to 20 mg/inch$^2$. The total adhesion amount of 3.0 mg/inch$^2$ or more tends to more improve color development over the whole of the recording region A. The total adhesion amount of 32 mg/inch² or less tends to more suppress blurring. When the amount of the colored ink composition adhered is 3.0 mg/inch² or more, the clear ink composition may not be adhered to the region B corresponding to the recording region A.

EXAMPLES

The present disclosure is more specifically described below by using examples and comparatist examples. The present disclosure is not limited to the examples below.

1. Preparation of Ink Composition

Components were mixed to provide the compositions described in Table 1 below, preparing colored ink compositions and clear ink compositions. Table 1 shows the compositions in terms of % by mass. In addition, a composition containing only water does not corresponding to a clear ink, but for the sake of convenience, the composition containing only water is described as clear ink 5 below.

TABLE 1

|  |  | Colored ink composition | | | Clear ink composition | | | | |
| --- | --- | --- | --- | --- | --- | --- | --- | --- | --- |
|  |  | 1 | 2 | 3 | 1 | 2 | 3 | 4 | 5 |
| Sublimation dye | DB359 | 5.0% | | | | | | | |
|  | DR60 | | 5.0% | | | | | | |
|  | DY54 | | | 5.0% | | | | | |
| Water-soluble organic solvent | Propylene glycol | 5.0% | 5.0% | 5.0% | 5.0% | | 5.0% | | |
|  | Glycerin | 10.0% | 10.0% | 10.0% | 10.0% | | 10.0% | | |
|  | 2-Pyrrolidone | | | | | | | 15.0% | |
|  | Triethylene glycol monomethyl ether | 5.0% | 5.0% | 5.0% | 5.0% | | 5.0% | | |
|  | 1,2-Hexanediol | | | | | | | 5.0% | |
| Surfactant | BYK348 | 0.5% | 0.5% | 0.5% | 0.5% | 0.5% | | | |
|  | Olfine E1010 | | | | | | 0.5% | 0.5% | |
|  | Water | 74.5% | 74.5% | 74.5% | 79.5% | 99.5% | 79.5% | 79.5% | 100.0% |
|  | Total | 100.0% | 100.0% | 100.0% | 100.0% | 100.0% | 100.0% | 100.0% | 100.0% |
|  | Surface tension [mN/m] | 23.2 | 23.4 | 23.5 | 23.3 | 24.2 | 31.2 | 33.4 | 72 |

The abbreviations and product components used in Table 1 are as follows.
Sublimation Dye
DB359: C. I. Disperse Blue 359
DR60: C. I. Disperse Red 60
DY54: C. I. Disperse Yellow 54
Water-soluble organic solvent
Propylene glycol
Glycerin
2-Pyrrolidone
Triethylene glycol monomethyl ether
1,2-Hexanediol
Surfactant
BYK 348 (silicone-based surfactant, manufactured by BYK Chemie Inc.)
Olfine E1010 (acetylene glycol-based surfactant, manufactured by Nissin Chemical Industry Co., .td.)

1. 1. Measurement of Surface Tension

The surface tension of each of the ink compositions was measured at a liquid temperature of 25° C. by a Wilhelmy method using a surface tensiometer (surface tensiometer, CBVP-Z manufactured by Kyowa Interface Science Co., Ltd.).

2. Evaluation Method
2. 1. Color Development in Low-Duty Portion

The colored ink compositions 1 to 3 were adhered to intermediate transfer medium 1 or 2 having a peeling layer, containing a resin having a glass transition point of 100° C. or more 200° C. or less, with a resolution of 720 dpi×720 dpi and a duty of 20% by using an ink jet printer (PX-G930, manufactured by Seiko Epson Corporation) to form a recording region A with respective single-color solid patterns. In the recording region A, the printing positions of the colored ink compositions 1 to 3 were formed to be adjacent to each other.

Also, each of the clear ink compositions was adhered to a recording medium to form a region B by another ink jet printer (PX-G930, manufactured by Seiko Epson Corporation) or spraying.

Next, the formed region A was adhered to the region B so as to face each other, and then sublimation-transferred by heating using a heat press machine (TP-608M, manufactured by Taiyo Seiki Co., Ltd.) under the conditions described in Table 2, forming each of the recorded matters. The colored ink compositions and the clear ink compositions were adhered at the same time, and the time taken from the adhesion to transfer of the ink compositions was 30 seconds. In addition, the room temperature was 25° C., and the humidity was 30%.

The "duty" represents a value calculated by a formula below, and "100% duty" represents that one ink droplet is adhered to each of all pixels.

Duty (%)=Number of actual printed dots/(longitudinal resolution×transverse resolution)×100

In the formula, the "number of actual printed dots" is the number of actual printed dots per unit area, and "longitudinal resolution" and "transverse resolution" are each resolution per unit area.

In a portion (low-duty portion) with a duty of 20% of the image on the recording medium formed as described above, the OD value of each of the colored ink compositions 1 to 3 was measured by using a reflection densitomer (trade name: Spectrolino, manufactured by Gretag Inc.). In addition, the OD value of each of the colored ink compositions 1 to 3 was evaluated assuming that when the clear ink composition was not coated, the OD value of each color was 100% (Comparative Example 1).

Evaluation Criteria image formed as described above, and evaluation was made according to the following criteria.

Evaluation Criteria

A: No discoloration was observed.
B: Slight discoloration was observed.
C: Discoloration was observed.

TABLE 2

|  |  | Example 1 | Example 2 | Example 3 | Example 4 | Example 5 | Example 6 | Example 7 |
|---|---|---|---|---|---|---|---|---|
| Colored ink adhering step | Colored ink composition No. | 1, 2, 3 | 1, 2, 3 | 1, 2, 3 | 1, 2, 3 | 1, 2, 3 | 1, 2, 3 | 1, 2, 3 |
|  | Intermediate transfer medium No. | 1 | 1 | 1 | 1 | 1 | 1 | 1 |
|  | Adhesion mount of colored ink (mg/inch$^2$) | 1.05 | 1.05 | 1.05 | 1.05 | 1.05 | 1.05 | 1.05 |
| Clear ink adhering step | Clear ink composition No. | 1 | 2 | 1 | 2 | 1 | 1 | 1 |
|  | Recording medium No. | 1 | 1 | 1 | 1 | 2 | 3 | 4 |
|  | Adhesion amount of clear ink (mg/inch$^2$) | 30 | 30 | 5.25 | 5.25 | 5.25 | 5.25 | 5.25 |
|  | Method for adhering clear ink | Spraying | Spraying | Ink jet | Ink jet | Ink jet | Ink jet | Ink jet |
|  | Difference in surface tension $|S_1 - S_2|$ | 0.1~0.2 | 0.7~1.0 | 0.1~0.2 | 0.7~1.0 | 0.1~0.2 | 0.1~0.2 | 0.1~0.2 |
| Transfer step | Transfer temperature | 180° C. | 180° C. | 180° C. | 180° C. | 180° C. | 180° C. | 180° C. |
|  | Transfer time | 40 seconds | 40 seconds | 40 seconds | 40 seconds | 40 seconds | 40 seconds | 40 seconds |
| Evaluation | Color development in low-duty portion | A | B | A | B | A | B | B |
|  | Blurring | B | B | A | A | A | B | A |
|  | Discoloration of recording medium | A | A | A | A | A | A | A |

|  |  | Example 8 | Example 9 | Example 10 | Example 11 | Comparative Example 1 | Compartive Example 2 |
|---|---|---|---|---|---|---|---|
| Colored ink adhering step | Colored ink composition No. | 1, 2, 3 | 1, 2, 3 | 1, 2, 3 | 1, 2, 3 | 1, 2, 3 | 1, 2, 3 |
|  | Intermediate transfer medium No. | 2 | 1 | 1 | 1 | 1 | 1 |
|  | Adhesion mount of colored ink (mg/inch$^2$) | 1.05 | 1.05 | 1.05 | 1.05 | 1.05 | 1.05 |
| Clear ink adhering step | Clear ink composition No. | 1 | 3 | 4 | 1 | — | 5 |
|  | Recording medium No. | 1 | 1 | 1 | 1 | 1 | 1 |
|  | Adhesion amount of clear ink (mg/inch$^2$) | 5.25 | 30 | 30 | 30 | — | 30 |
|  | Method for adhering clear ink | Ink jet | Spraying | Spraying | — | — | Spraying |
|  | Difference in surface tension $|S_1 - S_2|$ | 0.1~0.2 | 7.7~8.0 | 9.9~10.2 | 0.1~0.2 | — | 48.5~48.8 |
| Transfer step | Transfer temperature | 180° C. | 180° C. | 180° C. | 220° C. | 180° C. | 180° C. |
|  | Transfer time | 40 seconds | 40 seconds | 40 seconds | 40 seconds | 40 seconds | 40 seconds |
| Evaluation | Color development in low-duty portion | B | A | A | A | D | C |
|  | Blurring | A | C | D | B | B | D |
|  | Discoloration of recording medium | A | A | A | C | A | A |

A: The OD value of any one of the colored ink compositions 1 to 3 relative to Comparative Example 1 was 120% or more.
B: The OD value of any one of the colored ink compositions 1 to 3 relative to Comparative Example 1 was 110% or more and less than 120%.
C: The OD value of any one of the colored ink compositions 1 to 3 relative to Comparative Example 1 was over 100% and less than 110%.
D: The OD value of any one of the colored ink compositions 1 to 3 relative to Comparative Example 1 was 100%.

2. 2. Blurring

It was confirmed by visual observation whether or not blurring occurs at the boundaries between the adjacent solid patterns of the colored ink compositions 1 to 3 formed as described above, and evaluation was made according to the following criteria.

Evaluation Criteria

A: Blurring was not observed at the boundaries of the recording region.
B: Blurring was a little observed at the boundary portions of the recording region.
C: Blurring was slightly observed at the boundary portions of the recording region.
D: Blurring was observed at the boundary portions of the recording region.

2. 3. Discoloration of Recording Medium

It was confirmed by visual observation whether or not discoloration occurs in the recording medium having the Intermediate transfer medium Intermediate transfer medium 1: Subli-Light (No-cut) (manufactured by Forever Inc.)
Intermediate transfer medium 2: Subli-Flex (No-cut) Red (manufactured by Forever Inc.)

Recording medium

Recording medium 1: cotton fabric
Recording medium 2: mixed fabric composed of 35% by mass of cotton and 65% by mass of polyester fibers
Recording medium 3: wood
Recording medium 4: leather 3. Evaluation Result Table 2 shows the evaluation results of the inks used in the examples. Table 2 indicates that in the recording method using the intermediate transfer medium having the peeling layer, containing a resin having a glass transition point of 100° C. or more and 200° C. or less, the clear ink composition is adhered to the recording medium and used, thereby improving color development of the resultant recorded matter and suppressing blurring. Also, it was found that discoloration of the recording medium is suppressed according to the heating conditions.

What is claimed is:
1. A recording method comprising:
a colored ink adhering step of adhering a colored ink composition to an intermediate transfer medium by an ink jet method to form a recording region A;

a clear ink adhering step of adhering a clear ink composition to at least a portion of a recording medium to form a region B; and a transfer step of transferring an image formed in the recording region A to the region B of the recording medium by overlapping the recording region A to the region B and heating in a state where the clear ink in the region B contains a predetermined amount of liquid, wherein the colored ink composition contains a sublimation dye, a water-soluble organic solvent, and water; and the intermediate transfer medium has a peeling layer containing a resin having a glass transition point of 100° C. or more and 200° C. or less.

2. The recording method according to claim 1, wherein the heating temperature in the transfer step is 160° C. to 190° C.

3. The recording method according to claim 1, wherein the resin contained in the peeling layer contains one or more selected from the group consisting of polyester, polystyrene, polyacryl, polystyrene-acrylic resin, poly(ethylene-vinyl acetate), and a polymer based on diallyl methyl ammonium chloride.

4. The recording method according to claim 1, wherein the absolute value of difference between the surface tension $S_1$ of the colored ink composition and the surface tension $S_2$ of the clear ink composition is within 5.0.

5. The recording method according to claim 1, wherein the colored ink composition and the clear ink composition contain the same one or more water-soluble organic solvents.

6. The recording method according to claim 1, wherein the recording medium is a fabric containing cotton.

7. The recording method according to claim 1, wherein the transfer step is performed in a state where the amount of the clear ink composition adhered to the region B is 1.0 mg/inch$^2$ or more.

8. The recording method according to claim 1, wherein when the recording region A has a recording region Al where the amount of the colored ink composition adhered thereto is less than 2.0 mg/inch$^2$, in the clear ink adhering step, the clear ink composition is adhered to a region B1, facing the recording region A1, in the region B.

9. The recording method according to claim 1, wherein when the recording region A has a recording region A2 where the amount of the colored ink composition adhered thereto is 2.0 mg/inch$^2$ or more, in the clear in adhering step, the clear ink composition is not adhered to a region B2, facing the recording region A2, in the region B.

10. The recording method according to claim 1, wherein the total amount of the colored ink composition and the clear ink composition adhered to the facing recording region A and region B, respectively, is 3.0 to 32 mg/inch$^2$.

11. The recording method according to claim 1, wherein the clear ink composition contains a water-soluble organic solvent and water.

* * * * *